United States Patent [19]

Merkle

[11] Patent Number: 4,565,390
[45] Date of Patent: Jan. 21, 1986

[54] ROCKER ARM MOUNTING

[75] Inventor: Josef Merkle, Esslingen, Fed. Rep. of Germany

[73] Assignee: Daimler-Benz Aktiengesellschaft, Stuttgart, Fed. Rep. of Germany

[21] Appl. No.: 639,330

[22] Filed: Aug. 10, 1984

[30] Foreign Application Priority Data

Aug. 10, 1983 [DE] Fed. Rep. of Germany ....... 3328822

[51] Int. Cl.4 ............................................. B60G 11/14
[52] U.S. Cl. .................................. 280/726; 180/73.4; 180/905
[58] Field of Search ....................... 280/724, 725, 726; 180/73.4, 905, 906

[56] References Cited

U.S. PATENT DOCUMENTS 3,944,247 3/1976 Cook ................................... 280/726

FOREIGN PATENT DOCUMENTS 3039051 5/1982 Fed. Rep. of Germany ...... 280/726

Primary Examiner—Joseph F. Peters, Jr.
Assistant Examiner—Kenneth R. Rice
Attorney, Agent, or Firm—Barnes & Thornburg

[57] ABSTRACT

A device is provided to prevent lateral movements of a motor vehicle body relative to a vehicle axle, having a fixture pin, a rocker arm constructed as a double lever and pivotable by its central part about the fixture pin, and two guide rods which are each connected articulately by their one end to one of the rocker arm arms. In order to keep the overall height for the rocker arm mounting as low as possible and to be able to achieve high load capacity both in the rocker arm axis direction and also perpendicularly to the latter, together with high tilting rigidity, the rocker arm is mounted in a circumferential groove of a bearing body which consists of two discs pluggable onto the fixture pin, mutually connectable integrally in rotation and conjointly forming the circumferential groove by their circumferential surfaces, and which is anchorable on the fixture base supporting the fixture pin.

10 Claims, 4 Drawing Figures

FIG. 3
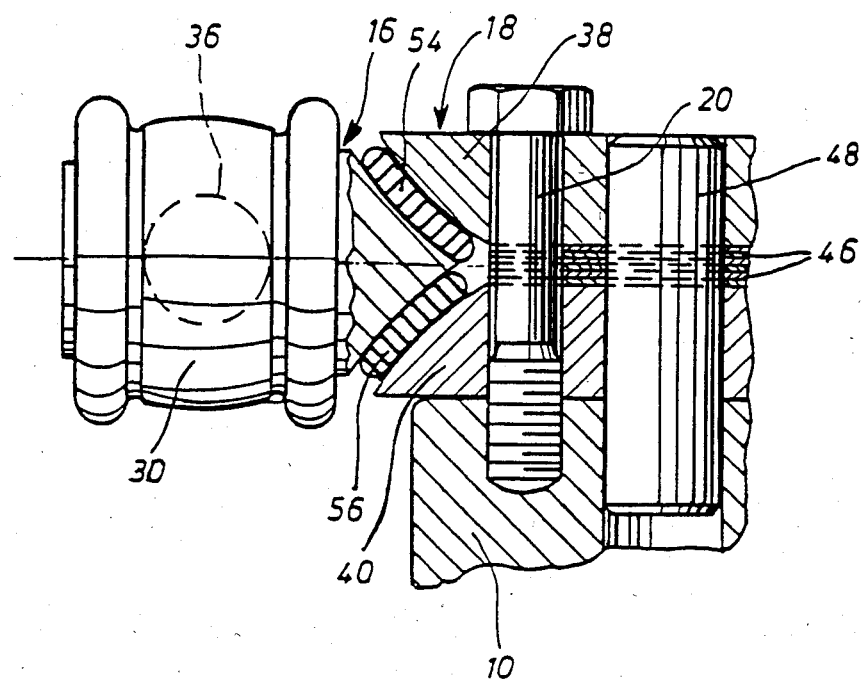
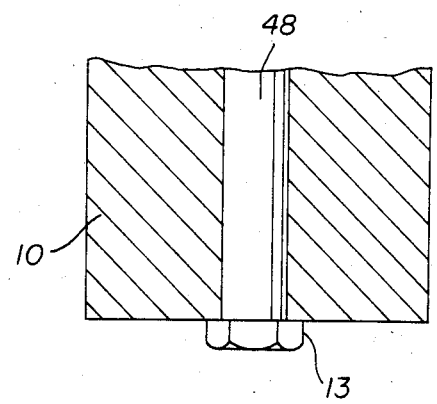
FIG. 4

ROCKER ARM MOUNTING

BACKGROUND AND SUMMARY OF THE INVENTION

The present invention relates generally to devices for preventing lateral movements of a motor vehicle body relative to the vehicle axle and, more particularly, to such assemblies having rocker arms pivotally mounted to the vehicle axle.

German Offenlegungschrift No. 30 39 051 shows an assembly for preventing vehicle body lateral movement according to prior teachings. In that construction, the rocker arm is mounted directly on the fixture pin, which therefore has to absorb all the support forces, stresses, and moments introduced into the rocker arm through the guide rods. As a result, the fixture pin must be correspondingly dimensioned in diameter and height.

However, it has been found to be desirable to reduce the overall height and/or weight of such assemblies in modern motor vehicles. It is also desirable to relieve the direct bearing function of the fixture pin and maintain a high load capacity in both directions of the rocking axis and also in the radial direction. Further, it is desirable to provide simplified constructions of such assemblies.

It is therefore an object of the present invention to provide an improved lateral motion preventing assembly having a particularly low overall height.

Another object is the provision of a lateral motion preventing assembly having reduced stresses on the fixture pin and a high load capacity.

A further object is to provide a lateral motion preventing assembly having simplified construction and high tilting rigidity.

These and other objects of the present invention are attained by the provision of a device, for preventing lateral movements of a motor vehicle body relative to a vehicle axle, having a rocker arm rotatably mounted in a circumferential groove of a bearing body including a plurality of discs pluggable onto a fixture pin and attachable to a fixture base supporting the fixture pin. These discs conjointly form the circumferential groove by their circumferential surfaces and are mutually connectable. The rocker arm is constructed as a double lever and is pivotable by its central part about the fixture pin. Guide rods are each pivotally connected at one end to one of the rocker arm arms and, at their other ends, to the vehicle body.

The discs of the bearing body are responsible for mounting the rocker arm and securing it in the direction of the rocking axis. For these purposes, the discs are given a correspondingly favorable diameter and a low overall height. The fixture pin serves inter alia as an assembly aid for the bearing body such that the bearing body discs are mutually centered by it during assembly and can therefore be adjusted accurately into their fixing position.

The mutual securing of the bearing body discs provides self centering of the rocker arm relative to the rocking bearing surfaces formed by the circumferential groove of the bearing body and causes the fixture pin to be subject to only very low shear stresses because, due to the configuration of the bearing body, these forces are absorbed favorably and introduced into its fixture across a wide surface. Forces which are developed at the rocker arm are introduced into the wall surfaces of the circumferential groove of the bearing body as normal forces. The lines of action of these normal forces mutually intersect in each case at a point located outside the relevant disc and on the rocking axis or intersect through a region along the rocking axis. The normal forces produce a correspondingly lower specific pressure upon these wall surfaces the further apart the support poles or support points, defined by the intersections of the lines of force action, are from one another. An effective support interval is achieved by this means, so that the device according to the invention is also characterized by a high tilting regidity relative to tilting moments acting about an axis perpendicular to the axis of the fixture pin.

The circumferential groove of the bearing body can be formed circular arcuate or V-shaped in cross section. A particularly advantageous mounting can be achieved where the groove flanks are convexly curved, as viewed in cross section, and, together with a surface enlargement, permit the intersection points of the lines of force action, defined by the mutual interval of the support poles, to coincide with the rocking axis. In this case, the groove may be symmetrical or asymmetrical in cross section.

Further, the grooves can be mounted in positive engagement with the rocker arm. In this manner, the rocker arm mobility may be adjusted, where the bearing discs are mutually tensioned, by means of distance washers inserted between the discs of the bearing body. Also, where resilient elements are provided between the flanks of the groove and the opposing flanks of the rocker arm noise and vibration between the bearing body and the rocker arm may be damped.

Another advantageous assembly is achieved where the bearing body is attached to the fixture base by screws which also serve to mutually connect the discs and where the bearing body is tensioned to the fixture pin or the fixture base by means of a tensioning screw or nut screwable onto the fixture pin. In this case the mutual tensioning of the discs and their attachment can be performed in a single operation.

The present invention also presents the advantage of a possible combination of one or more guide members for the vehicle axle or the steering of a vehicle. For this purpose the latter may be mounted above and/or beneath the bearing body on the fixture pin.

Further objects, features, and advantages of the present invention will become more apparent from the following description when taken with the accompanying drawings which show, for purposes of illustration only, embodiments in accordance with the present invention.

BRIEF DESCRIPTION OF THE DRAWINGS

FIG. 3 shows a partial cross sectional side view of another rocker arm mounting constructed according to the principles of the present invention;

FIG. 4 shows a partial cross sectional side view of another means of mounting the fixture pin to the base.

DETAILED DESCRIPTION OF THE DRAWINGS

Figure 1:
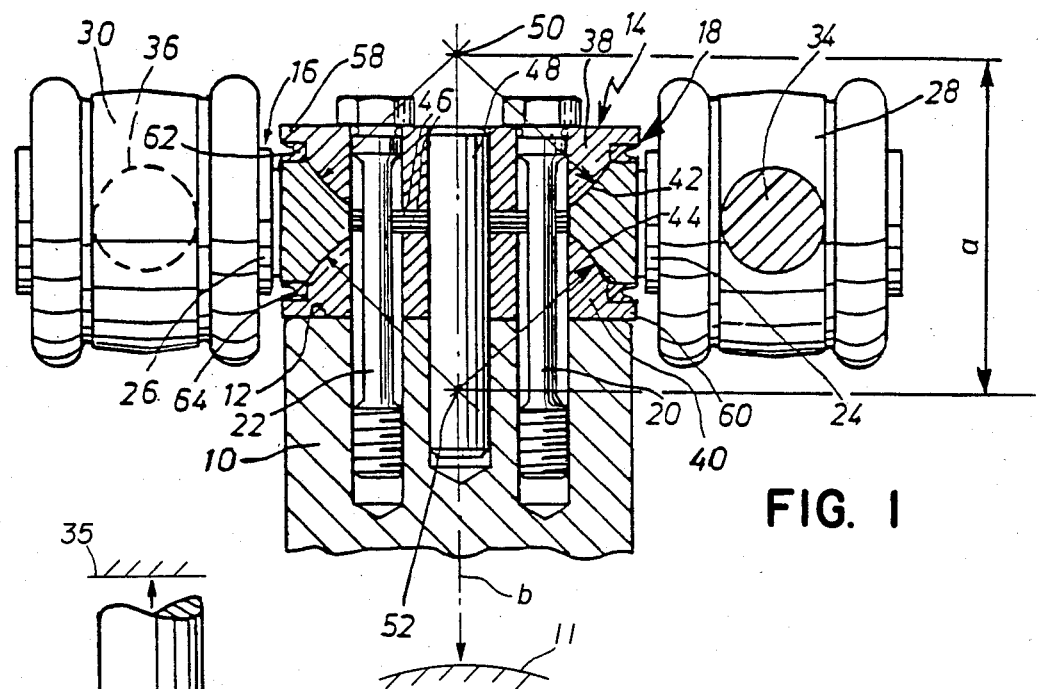
FIG. 1 shows a partial cross sectional side view of a rocker arm mounting constructed according to the principles of the present invention.
Figure 2:
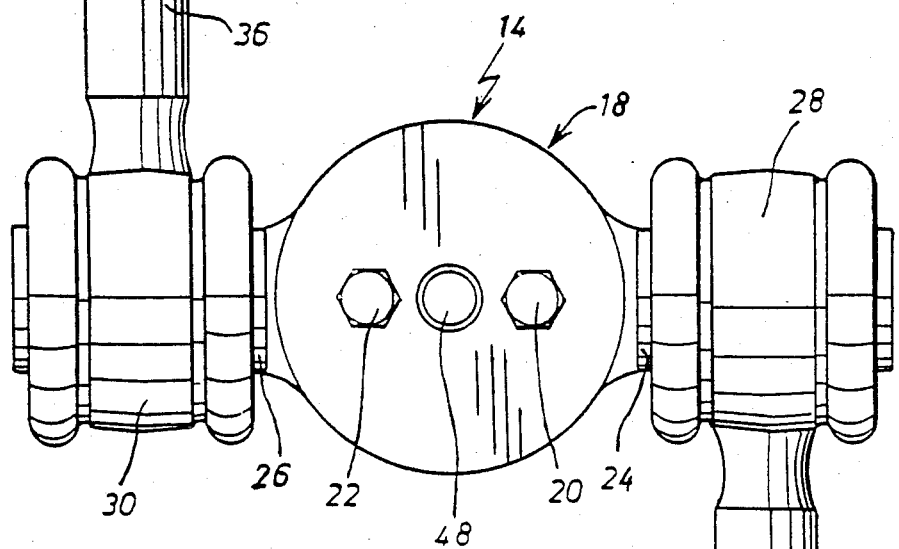
FIG. 2 shows a top view of the rocker arm mounting of FIG. 1.

FIG. 1 illustrates a preferred embodiment of the present invention. The general type of device shown in the drawings serves to prohibit lateral movements of the body of a motor vehicle relative to the vehicle axle. This device includes a fixture base or fastening socket 10 on the top side of the axle body of an axle 11, such as a rigid rear axle for example. Fixture base 10 is preferably located substantially in the center of the axle body top side and is provided with a plane horizontal fixture surface 12. Bearing arrangement 14 includes bearing body 18 and is fixed to fixture surface 12 and provides a mount for rocker arm 16.

Rocker arm 16 is constructed as a double lever and is pivotally mounted by its central part on the external circumference of bearing body 18, which is frictionally tensioned by means of fastening screws 20 and 22 to fixture surface 12 of fixture base 10. The bearing body 18 may also be tensioned to a fixture pin 48 by a nut 13 screwable onto the pin 48 as shown in FIG. 4. Rocker arm 16 includes rocker arm arms 24 and 26, each having mounted thereon an articulating or pivoting bearing 28 or 30 at one end of guide rod 34 or 36, respectively. Each such guide rod extends towards a longitudinal side of the motor vehicle (not shown) and is articulately connected to the vehicle body 35 at their other ends.

Bearing body 18 is preferably formed by two discs 38 and 40 screwed together by fastening screws 20 and 22. A circumferential groove of the bearing body is formed by circumferential surfaces 42 and 44 of discs 38 and 40, respectively. The central part of rocker arm 16 is in positive engagement with this circumferential groove. In this context, the mobility of the rocker arm can be adjusted by means of distance washers 46 inserted between the two discs 38, 40.

Fixture pin 48 is provided and maintained in fixture base 10 and projects outwardly from fixture surface 12. Discs 38 and 40 are pluggable onto fixture pin 48 for mutual centering and adjustment into their fastening position. As a result of the assembly of the present invention, this fixture pin need only have a comparatively small diameter. Although not specifically illustrated, the present invention contemplates that fixture pin 48 also be connected to the axle body by a flange.

The flanks of the circumferential groove of bearing body 18 are constructed with a symmetrical and V-shaped cross section and are convexly curved, forming dome-shaped bearing disks. This results in an enlargement of the bearing surfaces of rocker arm 16 and bearing body 18 in mutual contact. This also permits the centers of curvature 50 and 52 of dome-shaped discs 38 and 40 to be located on rocking axis b at equal intervals from the center of the circumferential groove of bearing body 18 in mutually opposite direction and outside of the discs. An effective support interval a, which ensures high tilting rigidity of bearing arrangement 14 is achieved in this way.

Screwing bearing body 18 to fixture base 10 further causes fixture pin 48 to be subject only to low shear stresses. The bearing arrangement of the present invention is therefore characterized not only by a low overall height, but also by the fact that it has a high load capacity both in the direction of rocking axis b and perpendicularly thereto, while fixture pin 48 is not directly involved in rocker arm mounting.

As shown in FIG. 3, the rocker arm mounting of the present invention may also be constructed to damp vibrations and noise. Resilient intermediate elements 54 and 56 are inserted between the bearing surfaces of the bearing body 18 and rocker arm 16. These intermediate elements are clamped loosely between the bearing surfaces, or fixedly attached to the bearing surfaces on one or both sides. If intermediate elements 54 and 56 are formed of rubber, then their attachment to the bearing surfaces can be effected by vulcanization. However, the present invention specifically contemplates that intermediate elements 54 and 56 may also be formed of a resilient plastic material.

Where rocker arm 16 is in positive engagement with the circumferential groove of bearing body 14, the present invention includes flanges 58 and 60 to limit the circumferential groove laterally. Flanges 58 and 60 are shaped integrally on discs 38 and 40, respectively. By undercutting these flanges an annular shoulder is produced to house sealing rings 62 and 64, respectively, which sealingly abut corresponding annular end faces of rocker arm 16 and therefore protect bearing arrangement 14 from dirt.

The construction of the device of the present invention makes it possible, within the ambit of the invention, to equip it with additional components of an axle guide system and/or of the steering system for steered wheels provided on a vehicle axis. For axle guidance, for example, a longitudinal guide rod serving to guide the axle may be mounted articulately above bearing body 14 on the fixture pin arranged upright on the axle body. The tensioning screw or tensioning nut 13, which is also provided for anchoring the bearing body upon an annular shoulder of the fixture pin or on a fixture surface of the axle body, serves to fasten the steering bearing upon the fixture pin.

Furthermore, according to the principles of the present invention, a device extending in the longitudinal direction of the vehicle, for mounting an upper guide rod or a guide member may also be mounted beneath the bearing body on the fixture pin. Also, the guide rod may advantageously be a pivotally mounted angular steering lever, one lever arm of which is articulated to a track rod, and its other lever arm to a steering rod. In this case, the bearing body, likewise resting upon an annular shoulder of the fixture pin should be tensioned axially to the latter.

The present invention also contemplates corresponding guiding and/or steering components to be arranged on the fixture pin on either side of the bearing body.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A bearing assembly for interconnecting a fixed fixture pin means supportably connectible with a vehicle axle body and at least two guide rod means, each having one end connected to relatively fixed vehicle body parts, said bearing assembly comprising:
    rocker arm means connected to the respective opposite ends of said guide rod means; and
    at least two disc means surrounding said fixture pin means and defining a respective mutually oppositely facing clamping surface means engageable with the rocker arm means for holding same in position relative to said pin means.

2. The assembly according to claim 1, wherein said clamping surface means are circumferential for forming a circumferential groove into which said rocker arm is rotatably mounted.

3. The assembly according to claim 2, wherein said rocker arm means forms a double lever which is pivotable by its central part about said fixture pin means, said rocker arm means including a plurality of rocker arm arms for pivotably connecting to said respective opposite ends of said guide rod means.

4. The assembly according to claim 3, further including a fixture base interposed between said disc means and said vehicle axle body for supporting said fixed pin means while connecting said disc means with said axle body.

5. The assembly according to claim 4, wherein flanks of said circumferential groove have a convexly curved, V-shaped cross section.

6. The assembly according to claim 4, wherein said circumferential groove is in positive engagement with said rocker arm means.

7. The assembly according to claim 4, further including resilient intermediate elements disposed between flanks of said circumferential groove and counter-flanks of said rocker arm means.

8. The assembly according to claim 4, wherein said disc means is supported by said fixture base and is attachable thereto by screw means, said screw means also serving for mutual connection of said disc means.

9. The assembly according to claim 4, wherein said disc means is tensionable to said fixture base, by means of at least one tensioning screw.

10. The assembly according to claim 4, wherein said disc means is tensional to said fixture pin means by means of a tensioning nut screwable onto said fixture pin means.

* * * * *